2,790,835
Patented Apr. 30, 1957

2,790,835

HYDROGENATION OF ISOPHORONES TO 3:3:5-TRIMETHYL-CYCLOHEXANOLS

Edward George Peppiatt, Romford, and Ronald James Wicker, Leigh-on-Sea, England, assignors to Howards of Ilford Limited, Ilford, England No Drawing. Application December 9, 1954,
Serial No. 474,271

Claims priority, application Great Britain
December 11, 1953

7 Claims. (Cl. 260—631)

It is known that 3:3:5-trimethyl-cyclohexanol can be obtained by the hydrogenation of isophorone. Dihydro-isophorone is formed as an intermediate product, so that it may be used as a starting material instead of isophorone. 3:3:5-trimethyl-cyclohexanol exists in two isomeric forms due to cis- and trans-isomerism. One of these isomers melts at about 58° C. and the other at about 37° C., but it is not at present known with certainty which is the trans-isomer and which the cis-isomer.

Processes for obtaining the high melting isomer alone or in admixture with a small amount of the low melting isomer have been described, in which isophorone or di-hydro-isophorone is catalytically hydrogenated with the use of a platinum catalyst.

The present invention provides a process for the manufacture of 3:3:5-trimethyl-cyclohexanol containing at least 80 percent by weight of the high melting isomer, which does not require the use of a platinum catalyst.

According to this invention, isophorone or dihydro-isophorone is reacted with hydrogen under pressure at a temperature not exceeding 100° C. in the presence of reduced metallic nickel as catalyst, and the catalyst is removed when 3:3:5-trimethyl-cyclohexanol having the desired content of 80 percent or more of the high melting isomer has been formed.

The need to remove the catalyst when the desired product has been formed, is due to the fact that, when the absorption of hydrogen ceases, the catalyst is capable of promoting conversion of the high melting isomer into the low melting isomer by isomerisation.

Advantageously a moderate pressure ranging from about 50 up to a few hundred pounds per square inch (gauge pressure) is used. A convenient pressure is about 100 pounds per square inch.

The reduced metallic nickel catalyst may be of any known type, for example, one produced by reducing nickel carbonate or nickel oxide with hydrogen, or it may be Raney nickel. The proportion of the catalyst may vary within wide limits, and is conveniently within the range of 1 to 10 percent on the weight of the isophorone or di-hydroisophorone used as starting material. The higher the proportion of the catalyst, when other conditions are the same, the more energetically the hydrogenation proceeds.

The process may be conducted with or without the addition of a solvent for the product obtained, and it will be understood that it is desirable to use a solvent when the reaction temperature is below the melting point of the product desired. As a solvent there may be used a saturated lower aliphatic alcohol, for example, methanol or ethanol, or a saturated aliphatic or cycloaliphatic hydrocarbon, for example hexane or cyclohexane.

Products having various contents of the high melting isomer from 80 percent up to about 90 percent can be obtained by suitably selecting the conditions of hydrogenation. The milder these conditions the higher is the proportion of the high melting isomer in the product.

Thus, an increase in the proportion of the high melting isomer can be brought about by working at a lower temperature or with a smaller proportion of the catalyst, or by lowering the concentration of the starting material when a solvent is used.

From products so obtained there can be produced by crystallisation from solvents in which the high melting isomer is less soluble than the low melting isomer, products having higher contents up to 100 percent of the high melting isomer. The high melting isomer is less soluble than the low melting isomer in most of the usual organic solvents, for example, ethyl alcohol, acetone, ether, light petroleum, benzene and ethylene dichloride, the latter being especially suitable.

In the following table are given the melting points of products having various contents of the high melting isomer:

| Percentage of high melting isomer | Melting point, °C. |
|---|---|
| 100 | 57.3 |
| 95 | 56.8 |
| 90 | 55.0 |
| 80 | 49.0 |

The melting points given in the above table are accurate to ±0.2 degree centigrade, and were determined by the time-temperature cooling curve method with the apparatus described in "Physical Methods of Organic Chemistry" by Weissberger, vol. 1, part 1, page 70, first paragraph. The flattened portion of the cooling curve, which portion follows the slight rise in temperature during cooling, is extrapolated back to the initial portion of the curve, and the point of intersection is taken as the melting point.

The following examples illustrate the invention, the parts being by weight:

Example 1

100 parts of isophorone or dihydroisophorone dissolved in 100 parts of methanol are placed in an autoclave, and 5 parts of reduced metallic nickel catalyst are added. Air is displaced from the autoclave with hydrogen, the autoclave is sealed, and the pressure of hydrogen is raised to 100 lbs. per square inch. The reaction mixture is mechanically stirred at 20° C. until the absorption of hydrogen ceases. The reaction mixture is then removed from the autoclave, the catalyst is filtered off, and the methanol is removed by distillation. The residue so obtained consists of colourless crystalline 3:3:5-trimethylcyclohexanol containing 90 percent of the high melting isomer.

Example 2

100 parts of isophorone or dihydroisophorone are placed in an autoclave, and 5 parts of reduced nickel catalyst are added. The air is displaced from the autoclave with hydrogen, the autoclave is sealed, and the pressure of hydrogen is raised to 100 lbs. per square inch. The mixture is mechanically stirred at 75° C. until the absorption of hydrogen ceases. The catalyst is then removed by filtration. The filtrate consists of 3:3:5-trimethyl-cyclohexanol containing 82 percent of the high melting isomer.

Example 3

20 grams of 3:3:5-trimethyl-cyclohexanol obtained by the hydrogenation process of this invention, and containing about 84 percent of the high melting isomer, were dissolved in 20 cc. of ethylene dichloride. The solution was cooled to 0° C., and 14.4 grams of a crystalline product were obtained by filtration. The product consisted of 3:3:5-trimethyl-cyclohexanol containing 91 percent of the high melting isomer.

In order to obtain a product containing a still higher percentage of the high melting isomer, 10.4 grams of the product obtained as described in the preceding paragraph were dissolved in 10 cc. of ethylene dichloride, and the solution was cooled to 0° C. and filtered. There were obtained 9.0 grams of trimethyl-cyclohexanol containing 96 percent of the high melting isomer.

Example 4

50 grams of the 3:3:5-trimethyl-cyclohexanol used as starting material in Example 3 were dissolved in 25 cc. of hot light petroleum (having a boiling range of 60–80° C.), and the solution was allowed to cool and stand at room temperature overnight. By filtering off the crystalline product there were obtained 43 grams of 3:3:5-trimethyl-cyclohexanol containing 91 percent of the high melting isomer.

We claim:

1. A process for the manufacture of 3:3:5-trimethyl-cyclohexanol containing at least 80 percent by weight of the high melting isomer, which comprises reacting a compound selected from the group consisting of isophorone and dihydroisophorone with hydrogen under pressure at a temperature not exceeding 100° C. in the presence of reduced metallic nickel as catalyst, and removing the catalyst when 3:3:5-trimethyl-cyclohexanol having a desired content of at least 80 percent of the high melting isomer has been formed.

2. A process for the manufacture of 3:3:5-trimethyl-cyclohexanol containing at least 80 percent by weight of the high melting isomer, which comprises reacting a compound selected from the group consisting of isophorone and dihydroisophorone with hydrogen under a pressure of about 100 pounds per square inch and at a temperature not exceeding 100° C. in the presence of reduced metallic nickel as catalyst, and removing the catalyst when 3:3:5-trimethyl-cyclohexanol having a desired content of at least 80 percent of the high melting isomer has been formed.

3. A process for the manufacture of 3:3:5-trimethyl-cyclohexanol containing at least 80 percent by weight of the high melting isomer, which comprises reacting a compound selected from the group consisting of isophorone and dihydroisophorone with hydrogen under pressure at a temperature not exceeding 100° C. in the presence of a proportion of a reduced metallic nickel catalyst within the range of 1 to 10 percent on the weight of the said compound, and removing the catalyst when 3:3:5-trimethyl-cyclohexanol having a desired content of at least 80 percent of the high melting isomer has been formed.

4. A process for the manufacture of 3:3:5-trimethyl-cyclohexanol containing at least 80 percent by weight of the high melting isomer, which comprises reacting a compound selected from the group consisting of isophorone and dihydroisophorone with hydrogen under pressure at a temperature not exceeding 100° C. in the presence of reduced metallic nickel as catalyst and in the presence of a solvent for the product formed, and removing the catalyst when 3:3:5-trimethyl-cyclohexanol having a desired content of at least 80 percent of the high melting isomer has been formed.

5. A process for the manufacture of 3:3:5-trimethyl-cyclohexanol containing at least 80 percent by weight of the high melting isomer, which comprises reacting a compound selected from the group consisting of isophorone and dihydroisophorone with hydrogen under pressure at a temperature not exceeding 100° C. in the presence of reduced metallic nickel as catalyst, removing the catalyst when 3:3:5-trimethyl-cyclohexanol having a desired content of at least 80 percent of the high melting isomer has been formed, and subsequently increasing the content of the high melting isomer in the product so formed by subjecting the latter to crystallisation from a solvent in which the high melting isomer is less soluble than the low melting isomer.

6. A process for the manufacture of 3:3:5-trimethyl-cyclohexanol containing at least 80 percent by weight of the high melting isomer, which comprises heating a compound selected from the group consisting of isophorone and dihydroisophorone in an autoclave with hydrogen under pressure at a temperature not exceeding 100° C. and above the melting point of the product formed in the presence of reduced metallic nickel as catalyst until the absorption of hydrogen ceases, and filtering off the catalyst when 3:3:5-trimethylcyclohexanol having a desired content of at least 80 percent of the high melting isomer has been formed.

7. A process for the manufacture of 3:3:5-trimethyl-cyclohexanol containing at least 80 percent by weight of the high melting isomer, which comprises heating a compound selected from the group consisting of isophorone and dihydroisophorone in an autoclave with hydrogen under pressure at a temperature below the melting point of the product formed in the presence of a solvent for the said product and in the presence of reduced metallic nickel as catalyst until the absorption of hydrogen ceases, and filtering off the catalyst when 3:3:5-trimethylcyclohexanol having a desired content of at least 80 percent of the high melting isomer has been formed.

References Cited in the file of this patent

UNITED STATES PATENTS

| | | |
|---|---|---|
| 1,811,711 | Blagden | June 23, 1931 |
| 1,811,777 | Blagden | June 23, 1931 |
| 2,514,329 | Morrell et al. | July 4, 1950 |

FOREIGN PATENTS

| | | |
|---|---|---|
| 854,799 | Germany | Nov. 6, 1952 |

OTHER REFERENCES

Birch et al.: J. Chem. Soc. (London), 1951, pgs. 1493–6.